United States Patent [19]

Knopp et al.

[11] 3,899,306

[45] Aug. 12, 1975

[54] EXOTHERMIC BRAZING OF ALUMINUM

[75] Inventors: Walter V. Knopp, Wyckoff; Paul J. Cascone, Haledon, both of N.J.

[73] Assignee: A. Johnson & Co. Inc.

[22] Filed: Dec. 21, 1973

[21] Appl. No.: 427,366

[52] U.S. Cl. .................. 29/197; 29/498.5; 29/504
[51] Int. Cl.² ..................... B23P 3/14; B23P 3/10
[58] Field of Search ....... 29/498.5, 504, 197, 472.3, 29/498, 500; 164/54

[56] References Cited
UNITED STATES PATENTS

| | | | |
|---|---|---|---|
| 2,821,014 | 1/1958 | Miller | 29/197 |
| 3,322,517 | 5/1967 | Miller | 29/197 |
| 3,358,356 | 12/1967 | Long | 29/498.5 |
| 3,415,697 | 12/1968 | Bredzs et al. | 29/498.5 X |

*Primary Examiner*—J. Howard Flint, Jr.
*Assistant Examiner*—Gus T. Hampilos
*Attorney, Agent, or Firm*—Hopgood, Calimafde, Kalil

[57] ABSTRACT

Aluminum parts are exothermically brazed together by applying a thin layer of nickel powder between adjacent surfaces of a pair of aluminum parts which are thereafter tightly pressed together, the assembled parts being thereafter heated to a temperature of about 1000°F (537°C) to 1200°F (650°C) but below the melting point of said parts, whereby an exothermic reaction is effected at the interface of said parts between the nickel powder and the abutting aluminum surfaces to form a strong fluxless brazed joint therebetween.

8 Claims, No Drawings

EXOTHERMIC BRAZING OF ALUMINUM

This invention relates to the exothermic brazing of aluminum parts. By the term "aluminum parts" is meant parts made of aluminum and aluminum-base alloys.

STATE OF THE ART

Aluminum parts are difficult to braze due to the presence of a natural oxide coating on the surface to be brazed. Because of this, it is necessary to use a flux which melts below the brazing temperature and which improves wettability of the surface to brazing alloys. The fluxes employed are usually alkali metal halides. However, such fluxes have inherent disadvantages in that they leave residues at the joint which are corrosive to the abutting surfaces thereof.

Attempts to avoid the use of fluxes in the brazing of aluminum parts have led to the use of fluxless exothermic brazing techniques utilizing brazing powders made up of components which react with each other exothermically during heating, thereby permitting brazing of the aluminum parts together. In this connection, reference is made to U.S. Pat. No. 3,415,697 which discloses brazing filler alloy compositions which are capable of generating exothermic heat and thus permit brazing at lower temperatures of parts of aluminum and aluminum-base alloys.

According to the foregoing patent, the fluxless brazing composition comprises an unreacted mixture of a particulate aluminum alloy, e.g. Al-Mg, with another particulate aluminum alloy, e.g. Al-Si, which mixture is pressed into discs for using in brazing aluminum parts together. A disc of the brazing composition is placed between abutting surfaces of two aluminum parts and the assembly C-clamped together and then heated with a torch, whereby the magnesium and silicon of the mixed alloys react exothermically to provide a brazed joint, the product of the exothermic reaction in this case being $Mg_2Si$. The heat evolved melts the filler brazing composition, the base metal of the parts in contact with the braze material being superficially melted and dissolved in the molten filler metal. However, care must be taken to control the composition of the exothermically reactable filler metal mixture so as to avoid going substantially over the melting point of aluminum (660°C) and, therefore, consideration is given to adding a melting point depressant element to the mixture.

It would be desirable to provide a more simple and easier-to-work exothermic brazing system which avoids the foregoing problems.

OBJECTS OF THE INVENTION

It is thus the object of the invention to provide a method for carrying out the exothermic brazing of aluminum parts in a simple and expeditious manner.

Another object is to provide a method for exothermically brazing aluminum parts together wherein the brazing metal or metal mixture is one that effects bonding of the parts by a superficial exothermic reaction between the brazing composition and the aluminum substrates in contact therewith.

These and other objects will more clearly appear when taken in conjunction with the following disclosure and the appended claims.

STATEMENT OF THE INVENTION

Stating it broadly, the invention is directed to a method for the fluxless brazing of aluminum parts comprising abutting selected surfaces of said parts tightly together with a thin layer of nickel powder of average size below 20 microns disposed uniformly along the interface thereof and then heating the assembled parts to a temperature within the range of about 1000°F (537°C) to 1200°F (650°C) but below the melting point of said parts, such that an exothermic reaction is effected at the interface of said parts between the nickel powder and the selected abutting surfaces to form a strong fluxless brazed joint at the interface of said parts. The invention also relates to the joint produced by said method.

In a preferred embodiment, the nickel powder may contain up to about 7% by weight of tin powder and, more preferably, from about 2% or 3% to 6% by weight of tin. The presence of tin in the nickel brazing powder is particularly desirable where the aluminum parts are made of aluminum alloy containing copper. Thus, the invention may be employed on aluminum alloys containing by weight up to about 6% copper, up to about 5% magnesium, up to about 1 or 2% silicon and the balance essentially aluminum. The terms "balanced essentially" or "consisting essentially" are understood not to exclude the presence of one or more optional elements, such as manganese, chromium, zinc and other elements. The term "aluminum" used in the disclosure and the claims is meant to cover such alloys.

The invention is applicable to the brazing of powder metallurgy parts, especially while said parts are being sintered. That is to say, the sintering and the brazing steps may be carried on simultaneously in the sintering furnace.

For example, cold pressed parts produced from aluminum powder may be brazed and sintered together by assembling the parts with a thin layer of nickel powder with or without tin uniformly dispersed at the interface thereof and the assembly heated under non-oxidizing conditions at a sintering temperature (e.g. 1000°F to 1200°F) at which exothermic brazing also occurs.

Where the aluminum powder has mixed with it copper in the unalloyed form (referred to as primary copper), it is not necessary to mix tin with the nickel although it may be used. However, it is preferred, though not necessary, to use tin where the copper in the aluminum powder is in the alloyed form.

DETAILS OF THE INVENTION

As illustrative of the invention, the following example is given.

EXAMPLE 1

An aluminum alloy powder referred to as Alcoa 201AB was employed in the test. The powder which was substantially minus 100 mesh (U.S. Standard) assayed by weight 4.4% Cu, 0.8% Si, 0.5% Mg and the balance aluminum. The powder was cold compacted into several cylinders measuring 1 inch in diameter and 1 inch high at a compaction pressure of 20 tsi (tons/sq-.inch) to produce bodies about 95% dense, using about 1½% by weight of synthetic amide wax as a lubricant mixed with the powder.

On the flat face of one of the cylinders, a thin layer of a mixture of nickel powder and tin powder (95%

Ni-5% Sn) was applied as a paste formed by mixing the powder with glycol, the thickness of the layer ranging anywhere from 0.001 to 0.005 mils. Another cylinder of the same batch powder was axially abutted against the flat face containing the thin layer and the two cylinders pressed tightly together at a pressure of about 200 psi (lbs/in$^2$).

The assembled cylinders were placed in a furnace and subjected to pre-burning in a nitrogen atmosphere at a temperature of about 800°F to evaporate the lubricant in the pressed cylindrical compacts. The assembly was then sintered at 1100°F (595°C) under non-oxidizing conditions, for example, in a non-oxidizing atmosphere of nitrogen at a dew point below 0°F (−18°C). During sintering at 1100°F, the thin brazing layer reacts with the aluminum substrates exothermically and produces a strongly bonded joint at the common interface of the two cylinders.

Following sintering, some of the aluminum assemblies were cooled to 500°F (260°C) in nitrogen and then air cooled to room temperature. Following air cooling, others were heat treated for 30 minutes at 940°F (500°C) in air, quenched in cold water and then aged for 18 hours at 320°F (160°C).

The tensile strength of the brazed joint following sintering was 17,000 psi (lbs/in$^2$). Following heat treatment, the strength was 31,000 psi. The sintered strength of the base metal itself was 21,000 psi. As will be noted, good bond strength was obtained.

It might be added that the foregoing aluminum alloy (201 AB) is generally difficult to braze as its melting point is below the melting point of the brazing alloys normally employed in the brazing of plain aluminum.

The nickel powder employed is finely divided and preferably has an average particle size of less than 20 microns. The nickel powder may be reduced nickel oxide, carbonyl nickel powder and the like. Carbonyl nickel is preferred as the source of nickel. Examples of carbonyl nickel powder are the following: (1) Type 123 carbonyl nickel having a size of about 4 to 7 microns FSS (Fisher Sub-Sieve Size) and an apparent density of about 2 to 2.7 grs/cc; (2) Type 255 carbonyl nickel having a size of about 2.3 to 3.4 microns (FSS) and an apparent density of about 0.5 to 0.6 grs/cc; and (3) Type 287 having a size of 2.9 to 3.6 microns and an apparent density of about 0.8 to 1 gr/cc.

EXAMPLE 2

Several 1 inch diameter cylinders were pressed from Type 201 aluminum powder in which the copper was present in the unalloyed form (primary copper), the amount being 4.4% by weight of the total composition, the other ingredient comprising 0.8% silicon and 0.5% magnesium. The cylinders were 90% dense.

One cylinder was superposed on top of the other with a thin layer of 100% carbonyl nickel powder interposed therebetween. The carbonyl nickel powder was applied by spraying a suspension of nickel in glycol to provide a layer of about 0.003 to 0.005 inch. Several assemblies were prepared. Pressure was applied to the superposed cylinders at about 150 to 250 psi to assure a tight fit and a thickness of the braze layer of about 0.0015 inch. The assembled cylinders were placed in a sintering furnace and preburned at 800°F and then heated to 1100°F (595°C) and held at that temperature for about 10 to 20 minutes in dry nitrogen and cooled from the sintering temperature in the furnace to 500°F (260°C) and finally air cooled to room temperature. A strong brazed joint was obtained. The as-sintered tensile strength of the brazed joint was 22,000 psi.

Examples of other aluminum alloys that can be brazed either as a powder metallurgy part or as a wrought material include Type 601 AB containing 0.25% Cu, 0.6% Si, 1.0% Mg and the balance aluminum; Type 602 AB containing 0.4% Si, 0.6% Mg and the balance aluminum and other compositions.

EXAMPLE 3

Two pieces of wrought aluminum, Type 1011 were superposed one on top of the other with a thin layer of a nickel-tin (95% Ni-5% Sn) powder composition interposed therebetween of about 0.003 inch thick as in Examples 1 and 2. The parts were pressed together to provide a braze thickness of 0.001 inch and placed in a furnace which was heated to 1150°F. After completion of the exothermic reaction, the assembled aluminum parts were cooled in place. A strong joint was obtained by virtue of the reaction of nickel with the aluminum substrates.

As stated hereinbefore, the invention is particularly applicable to the combined sintering and brazing of green compacts of aluminum powder compositions. The green compacts which may be treated generally have densities of over 85% of true density, particularly at least about 90% dense and ranging up to 95 or 98% dense. In producing such compacts, the aluminum powder composition is provided with about 1 to 2.5% by weight of a pressing lubricant of synthetic amide wax and the aluminum powder composition compacted in a die at a pressure ranging from about 15 to 35 tsi.

As stated hereinbefore, the finely divided nickel powder should preferably have an average size of less than 20 microns and preferably less than 10 microns. Carbonyl nickel powder is preferred. Such powders may range in size from about 2 or 3 microns to 7 or 8 microns in size.

One of the advantages of the invention is that P/M parts (powder metallurgy parts) of aluminum can be easily brazed together without fear of losing the brazing material by infiltration into the porous structure as normally occurs when a brazing alloy is employed that melts during sintering. The nickel powder brazing material in this instance does not melt per se before brazing occurs and, therefore, is not lost by infiltration into the interstices of the aluminum part during sintering. The brazing reaction is an exothermic reaction between the nickel powder and the aluminum substrate in which a small amount of liquid phase may form at the interface during the reaction which quickly solidifies by virtue of the heat sink properties of the assembled parts at the temperature range of about 1000°F to 1200°F.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A fluxless brazed aluminum joint comprising two abutting aluminum surfaces bonded together by virtue of the presence of nickel at said abutting surfaces in the form of an exothermic nickel-aluminum reaction product.

2. A method for the fluxless brazing of aluminum parts which comprises,
abutting selected surfaces of said aluminum parts tightly together with a layer of finely divided metallic nickel brazing powder disposed at the interface thereof,
and then heating the assembled parts to a temperature within the range of about 1000°F and 1200°F but below the melting points of said parts,
whereby an exothermic reaction is effected at the interface of said parts between the finely divided metallic nickel powder layer and the selected abutting aluminum surfaces to form a strong fluxless brazed joint of the parts.

3. The method of claim 2, wherein the aluminum parts are made of an aluminum composition containing by weight up to about 6% copper, up to about 5% magnesium, up to about 2% silicon and the balance essentially aluminum, and wherein the layer of nickel brazing powder has an average size of less than 20 microns and also has mixed with it powdered tin in the amount of up to about 7% by weight of the mixture.

4. A method for the fluxless brazing of powder metallurgy parts of aluminum which comprises,
providing at least a pair of said aluminum parts cold pressed from aluminum powder to a green density of over 85% of true density,
abutting selected aluminum surfaces of said parts tightly together with a layer of metallic nickel brazing powder of average size below 20 microns disposed at the interface thereof,
and then heating the assembled parts to a combined sintering and brazing temperature within the range of about 1000°F to 1200°F but below the melting point of said parts,
whereby an exothermic reaction is effected at the interface of said parts between the nickel powder and the selected abutting aluminum surfaces during sintering, thereby forming a fluxless brazed joint of the parts.

5. The method of claim 4, wherein the aluminum parts are made of an aluminum composition containing by weight up to about 6% copper, up to about 5% magnesium, up to about 2% silicon and the balance essentially aluminum, and wherein the layer of nickel brazing powder also has mixed with it powdered tin in an amount ranging up to about 7% by weight of the mixture.

6. The method of claim 5, wherein the aluminum part contains the copper alloyed with aluminum, and wherein the layer of brazing powder consists essentially of about 2% to 6% tin and the balance essentially nickel.

7. A method for the fluxless brazing of aluminum parts which comprises,
providing said parts made of an aluminum composition containing up to about 6% copper, up to about 5% magnesium, up to about 2% silicon, and the balance essentially aluminum,
abutting selected surfaces of said parts tightly together with a layer of metallic nickel brazing powder containing up to about 7% tin, the nickel pwder having an average size below 20 microns,
said layer containing at least about 2% tin by weight of nickel when the aluminum composition of said parts contains at least about 0.25% copper alloyed therewith,
and then heating the assembled parts to a temperature within the range of about 1000°F to 1200°F but below the melting point of said parts,
whereby an exothermic reaction is effected at the interface of said parts between the nickel brazing powder and the selected abutting aluminum surfaces to form a strong fluxless brazed joint of said parts.

8. The method of claim 7, wherein the parts are made of compacted aluminum powder of over 85% true density, and wherein said parts in said assembled parts are simultaneously sintered and brazed at said temperature range of about 1000°F to 1200°F.

* * * * *